(12) United States Patent
Ohno

(10) Patent No.: US 9,499,013 B2
(45) Date of Patent: *Nov. 22, 2016

(54) PNEUMATIC TIRE

(75) Inventor: Yasuaki Ohno, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 567 days.

This patent is subject to a terminal disclaimer.

(21) Appl. No.: 14/000,552

(22) PCT Filed: Feb. 27, 2012

(86) PCT No.: PCT/JP2012/001324
§ 371 (c)(1),
(2), (4) Date: Aug. 27, 2013

(87) PCT Pub. No.: WO2012/120826
PCT Pub. Date: Sep. 13, 2012

(65) Prior Publication Data
US 2013/0327458 A1    Dec. 12, 2013

(30) Foreign Application Priority Data

Mar. 4, 2011 (JP) ................... 2011-048133

(51) Int. Cl.
*B60C 3/06* (2006.01)
*B60C 15/00* (2006.01)
(Continued)

(52) U.S. Cl.
CPC ............ *B60C 15/0009* (2013.04); *B60C 3/06* (2013.01); *B60C 9/0292* (2013.04); *B60C 9/17* (2013.01);
(Continued)

(58) Field of Classification Search
CPC ............ B60C 3/04; B60C 3/06; B60C 9/0292; B60C 9/17; B60C 11/0304; B60C
(Continued)

(56) References Cited

U.S. PATENT DOCUMENTS 6,079,467 A * 6/2000 Ueyoko ................. B60C 15/06
152/539
6,527,025 B1 * 3/2003 Minami ................... B60O 5/12
152/527

(Continued)

FOREIGN PATENT DOCUMENTS

CN    1535215 A    10/2004
EP    0928708 A2    7/1999
(Continued)

OTHER PUBLICATIONS

Communication dated Mar. 24, 2015 from the European Patent Office in counterpart application No. 12754996.2.
(Continued)

*Primary Examiner* — Eric Hug
(74) *Attorney, Agent, or Firm* — Sughrue Mion, PLLC

(57) ABSTRACT

The present invention provides a pneumatic tire 1, comprising: a carcass ply including a main body portion 11a extending across respective bead cores 9 and turn-up portions 11b each turned up around the bead cores 9 from the main body portion 11a; a bead filler 13; and a side rubber 5a, wherein: a tip portion on the outer side in the tire radial direction of the outer end 13a of the bead filler 13, of each of the turned-up portions 11b, extends to a position of at least 5 mm distance from the outer end 13a of the bead filler with maintaining distance of 1 mm or less between the main body portion 11a and itself; a turn-up end 11c is disposed on the inner side in the tire widthwise direction than a neutral axis of bending of a bead portion 7 and a corresponding sidewall portion 5 and at 10%-40% height of a tire cross sectional height SH of the tire; and the side rubber 5a, disposed on the outer side in the tire widthwise direction of the main body portion 11a and each turn-up portion 11b, covers the turn-up end 11c and constitutes a part of an outer surface of the tire.

7 Claims, 3 Drawing Sheets

(51) Int. Cl.
    *B60C 11/03*     (2006.01)
    *B60C 9/17*     (2006.01)
    *B60C 15/02*     (2006.01)
    *B60C 9/02*     (2006.01)
    *B60C 11/04*     (2006.01)

(52) U.S. Cl.
    CPC .......... *B60C 11/033* (2013.04); *B60C 11/0304* (2013.04); *B60C 11/0332* (2013.04); *B60C 11/04* (2013.01); *B60C 15/0236* (2013.01); *B60C 2015/009* (2013.04); *B60C 2015/061* (2013.04)

(58) Field of Classification Search
    CPC ............. 11/033;B60C 11/0332; B60C 13/003; B60C 13/004; B60C 15/0036; B60C 15/0045; B60C 15/0009; B60C 5/00; B60C 15/0027; B60C 2015/009
    USPC .......... 152/209.1, 209.8, 209.9, 209.14, 539, 152/541, 548, 552, 554
    See application file for complete search history.

(56) References Cited

U.S. PATENT DOCUMENTS

| | | | | |
|---|---|---|---|---|
| 2004/0226642 | A1* | 11/2004 | Muhlhoff | B60C 3/04 152/454 |
| 2008/0115868 | A1* | 5/2008 | Eicher | B60C 11/00 152/209.5 |
| 2010/0294408 | A1* | 11/2010 | Bizzi | B60C 3/06 152/209.8 |
| 2010/0326579 | A1* | 12/2010 | Watabe | B60C 3/06 152/454 |

FOREIGN PATENT DOCUMENTS

| | | | |
|---|---|---|---|
| JP | 63-78802 | A | 4/1988 |
| JP | 7-223407 | * | 8/1995 |
| JP | 7-223407 | A | 8/1995 |
| JP | 08-175119 | A | 7/1996 |
| JP | 2000-177308 | A | 6/2000 |
| JP | 2000-313210 | A | 11/2000 |
| JP | 2002-192905 | * | 7/2002 |
| JP | 2002-192905 | A | 7/2002 |
| JP | 2004-237808 | A | 8/2004 |
| JP | 2004-535327 | A | 11/2004 |
| JP | 2006-176116 | A | 7/2006 |
| JP | 2009-001228 | A | 1/2009 |
| JP | 2009-6983 | A | 1/2009 |
| JP | 2010-125891 | A | 6/2010 |

OTHER PUBLICATIONS

Communication dated Mar. 19, 2015 from the State Intellectual Property Office of the People's Republic of China in counterpart application No. 201280011506.1.

Communication from Japan Patent Office issued Nov. 11, 2014, in counterpart Japan Patent Application No. 2013-503375.

International Search Report for PCT/JP2012/001324 dated Apr. 17, 2012.

Communication dated Jun. 23, 2015 from the Japanese Patent Office in counterpart application No. 2013-503375.

* cited by examiner

PNEUMATIC TIRE

CROSS REFERENCE TO RELATED APPLICATIONS

This application is a National Stage of International Application No. PCT/JP2012/001324 filed Feb. 27, 2012, claiming priority based on Japanese Patent Application No. 2011-048133 filed Mar. 4, 2011, the contents of all of which are incorporated herein by reference in their entirety.

TECHNICAL FIELD

The present invention relates to a pneumatic tire and in particular to a technique for reducing rolling resistance of a pneumatic tire, while maintaining sufficient durability and good stability and controllability of the pneumatic tire.

BACKGROUND ART

Conventional techniques for reducing rolling resistance of a tire include those disclosed in Patent Literature 1, Patent Literature 2 and the like. The invention disclosed in Patent Literature 1, which aims at providing a pneumatic tire capable of reducing rolling resistance without sacrificing stability, controllability and riding comfort, is characterized in that: a fold-back end of a carcass is positioned at the height of ≤0.15 time the height SH of the tire section; and a short fiber reinforced layer of ≥0.3 mm and ≤1.0 mm in thickness is arranged on the outer surface of the carcass in a sidewall area between a belt end and the fold-back end of the carcass. The short fiber reinforced layer is constituted of: a rubber component obtained by blending 30-60 parts by weight of natural rubber and/or isoprene rubber with 40-70 parts by weight of butadiene rubber; short fiber; and carbon black. At least 90% of the short fiber is oriented at an angle in the range of ±20° relative to the circumferential direction of the tire and the ratio of the complex elasticity $E^*a$ in the direction of orientation of the short fiber, with respect to the complex elasticity $E^*b$ in the direction orthogonal to the direction of orientation, is ≥5.

Further, the invention disclosed in Patent Literature 2, which aims at providing a pneumatic tire capable of making weight reduction and good stability and controllability thereof compatible without reducing riding comfort, is characterized in that: a carcass layer is made to be a single layer structure; ends of the carcass layer are each folded around a bead core from the inside toward the outside of the tire to interpose a bead filler therein, to a position which exceeds a tire maximum width and does not reach a belt layer; and the height of the bead filler measured from a bead heel is 15-30% of a tire cross section height SH, the rubber thickness of a sidewall portion is 3.5-5.0 mm, an inner liner is formed of a thermoplastic elastomer composition having Young's modulus of 5-50 MPa and thickness of 0.05-0.25 mm, and the sidewall portion is made of a rubber composition containing at least 70 wt. % of natural rubber.

CITATION LIST

Patent Literature

PTL 1: JP-A 08-175119
PTL 2: JP-A 2009-001228

SUMMARY OF THE INVENTION

Technical Problems

However, the invention disclosed in Patent Literature 1, which decreases rolling resistance of a tire by reducing tire weight by reducing a dimension in the tire radial direction of a fold-back portion of a carcass and a bead filler, tends to experience deterioration of stability and controllability due to decrease in rigidity of sidewall portions of the tire and there arises a problem that this deterioration of stability and controllability cannot be addressed even by providing an additional reinforcing layers at the sidewall portions.

Similarly, the invention disclosed in Patent Literature 2, although it can realize reduction of tire weight by reducing size of a bead filler, i.e. a shorter bead filler, experiences decrease in rigidity of side portions of the tire and therefore there arises a problem that stability and controllability cannot be well prevented from deteriorating in spite of efforts of enhancing rigidity of the side portions by increasing rubber thickness of the sidewall portions and forming an inner liner by a thermoplastic resin or a thermoplastic elastomer composition having higher Young's modulus and lower specific gravity than rubber.

More specifically, rolling resistance of a standard pneumatic radial tire for a passenger car, where height in the tire radial direction of a fold-back portion of a carcass is 40-50% of the tire cross section height SH, height in the tire radial direction of a bead filler is at least 25 mm and thickness of sidewall rubber is at least 2.5 mm, can be effectively reduced by decreasing the height in the tire radial direction of the fold-back portion to 10-40% of the tire cross section height SH, the height in the tire radial direction of the bead filer to 10 mm to 20 mm and the thickness of the sidewall rubber to 1 mm to <2.5 mm (such size reduction, in combination with resulting decrease in eccentricity of the tire, effectively reduces rolling resistance). However, rigidity of side portions of the tire inevitably deteriorates by this modification and it is very difficult to reliably obtain sufficiently high durability and required stability and controllability in such a case as this even by increasing thickness of sidewall rubber and the like.

In view of such problems as described above of the prior art, an object of the present invention is to provide a pneumatic tire capable of effectively reducing rolling resistance, while ensuring sufficiently high durability and good stability and controllability thereof.

Solution to the Problems

The present invention has been contrived to solve the aforementioned problems of the prior art. Specifically, a pneumatic tire of the present invention is characterized that it comprises: at least one carcass ply constituted of rubber-coated ply cords and including a main body portion extending in a toroidal shape across respective bead cores embedded in a pair of bead portions and turn-up portions respectively turned up around the bead cores from the main body portion to extend on the outer side in the tire radial direction; a bead filler provided between the main body portion and each of the turned-up portions to extend from the corresponding bead core on the outer side in the tire radial direction; and a side rubber, wherein a tip portion extending on the outer side in the tire radial direction than the outer end in the tire radial direction of the bead filler, of each of the turned-up portions, extends to a position of at least 5 mm distance from the outer end in the tire radial direction of the bead filler with maintaining distance of 1 mm or less between the tip portion and the main body portion of the carcass ply, a turn-up end as the outer end in the tire radial direction of each turn-up portion of the carcass ply is disposed on the inner side in the tire widthwise direction than a neutral axis of bending of the bead portion and a corresponding sidewall portion and at 10%-40% height of a tire cross section measured from the innermost end in the radial direction of the tire, and the side rubber, disposed on the outer side in the tire widthwise direction of the main body portion and each turn-up portion of the carcass ply, covers the turn-up end and constitutes a part of an outer surface of the tire.

In the present invention, when a cross section height SH of a tire is different between on the vehicle-outer side and inner side of the tire, the aforementioned requirement that "a turn-up end is disposed . . . at 10%-40% height of a tire cross section SH" is independently applied to each of the vehicle-outer side and the vehicle-inner side of the tire. A "tire cross section SH" represents in the present invention ½ of dimensional difference between outer and inner diameters of a tire inflated at a predetermined internal pressure under no load applied thereon as prescribed by JATMA. A "neutral axis of bending" represents a boundary between a portion subjected to tensile stress and a portion subjected to compressive stress of a bead portion and a corresponding sidewall portion when these two portions experience bending deformation and can be determined by calculating strains at the bead portion and the sidewall portion and continuously linking boundary points of tensile stress and compressive stress by using Finite Element Method (FEM).

In the pneumatic tire of the present invention, resistance to crack growth of a tire can be enhanced to ensure good durability thereof by: disposing the main body portion and each turn-up portion of the carcass ply such that these two portions in a region on the outer side in the tire radial direction of the bead filler extend with distance therebetween of 1 mm or less; disposing the turn-up end of each turn-up portion at a position on the inner side in the tire widthwise direction than the neutral axis of bending; and providing side rubber on the outer side in the tire widthwise direction of each turn-up end. Further, it is possible to reduce weight and eccentricity of a tire to decrease rolling resistance thereof by making the tire smaller by disposing each turn-up end of the carcass ply at 10%-40% height of a tire cross section SH measured from the innermost end in the radial direction of the tire (i.e. the rim diameter line). Yet further, it is possible to suppress occurrence of separation troubles originating at end portions of the carcass and the bead fillers by setting distance between each turn-up end and the corresponding bead filler end to be at least 5 mm so that significant discrepancy in rigidity is prevented from being generated at a single position and stress is well dispersed.

A pneumatic radial tire of the present invention is preferably characterized in that: in a cross sectional view in the tire widthwise direction of the pneumatic tire in a state where the tire is assembled with an application rim, inflated at a predetermined air pressure and mounted on a vehicle under a predetermined load exerted thereon, provided that: $L_{out}$ represents an imaginary line, passing through the maximum width position remotest from the tire equatorial plane in a sidewall portion situated on the vehicle outer side, to extend to be orthogonal to the tire equatorial plane; $L_{in}$ represents an imaginary line, passing through the maximum width position remotest from the tire equatorial plane in a sidewall portion situated on the vehicle inner side, to extend to be orthogonal to the tire equatorial plane; $H_{out}$ represents a distance in the tire radial direction between the imaginary line $L_{out}$ and a ground-contact end on the vehicle outer side of the tread; and $H_{in}$ represents a distance in the tire radial direction between the imaginary line $L_{in}$ and a ground-contact end on the vehicle inner side of the tread, $H_{out} < H_{in}$; radius of curvature ($R_{out}$) of an outer surface of the sidewall portion on the vehicle outer side, at the maximum width position thereof, is smaller than radius of curvature ($R_{in}$) of an outer surface of the sidewall portion on the vehicle inner side, at the maximum width position thereof; and a negative ratio of a ground-contact surface of the tread of a half portion, on the vehicle outer side with respect to the tire equatorial plane, of the tire when the tire is mounted on the vehicle is smaller than a negative ratio of a ground-contact surface of the tread of a half portion, on the vehicle inner side with respect to the tire equatorial plane, of the tire when the tire is mounted on the vehicle.

In the present invention, "radius of curvature at the maximum width position of a tire" represents radius of curvature of an arc passing through the maximum width position, remotest from the tire equatorial plane, of a sidewall portion.

When a vehicle with tires mounted thereon is run straight, a ground-contact length in the tread circumferential direction of a ground-contact surface portion situated on the vehicle inner side when the tire is mounted on the vehicle, of a tread of the tire, is relatively long, while a ground-contact length in the tread circumferential direction of a ground-contact surface portion situated on the vehicle outer side when the tire is mounted on the vehicle, of the tread, tends to be extremely short, such that an outline of a foot print takes on a substantially blunt triangle-like shape as shown in FIG. 3A. The present invention, being aware of this phenomenon, attempts to increase in the pneumatic tire thereof a ground-contact length in the tread circumferential direction of a ground-contact surface portion situated on the vehicle outer side when the tire is mounted on the vehicle, of the tread of the tire, to be equal to a ground-contact length in the tread circumferential direction of a ground-contact surface portion situated on the vehicle inner side when the tire is mounted on the vehicle, of the tread, during rotation of the tire under a load exerted thereon, such that a relatively large ground-contact area is ensured and the tire exhibits good stability and controllability in both straight running and cornering even when the weight of the tire has been reduced.

Further, a negative ratio, i.e. a groove area ratio, of a ground-contact surface of the tread of a half portion, on the vehicle outer side with respect to the tire equatorial plane, of the tire when the tire is mounted on the vehicle is made smaller than a negative ratio of a ground-contact surface of the tread of a half portion, on the vehicle inner side with respect to the tire equatorial plane, of the tire when the tire is mounted on the vehicle in the present invention, so that i) drainage performance of a ground-contact surface of the tread of the vehicle-inner side half portion of the tire is improved and ii) rigidity of land portions of a ground-contact surface of the tread of the vehicle-outer side half portion of the tire is enhanced to effectively generate cornering force, i.e. demonstrate good cornering performance.

Further, according to the pneumatic tire of the present invention, the aforementioned distance $H_{out}$ in the tire radial direction on the vehicle outer side is set to be smaller than the aforementioned distance $H_{in}$ in the tire radial direction on the vehicle inner side, thereby decreasing rigidity of a side portion and improving ground-contact properties on the vehicle-outer side of the tire. Yet further, the aforementioned radius of curvature $R_{out}$ of the sidewall portion on the vehicle outer side is set to be smaller than the aforementioned radius of curvature $R_{in}$ of the sidewall portion on the vehicle inner side, thereby further decreasing rigidity of the side portion on the vehicle outer side and ensuring a sufficiently large ground-contact area to improve stability and controllability on the vehicle-outer side of the tire.

In the present invention, an "application rim" represents a rim prescribed by any one of the following standards in accordance with tire size, "predetermined air pressure" represents air pressure corresponding to the maximum loading capacity in an application tire size prescribed in the standard, and a "predetermined load" represents a load corresponding to the maximum loading capacity in an application tire size prescribed in the standard.

The "standard" represents an industrial standard which is valid in a region where a tire is manufactured or used. Examples of the standard include "YEAR BOOK" of the Tire and Rim Association Inc. in the United States, "STANDARDS MANUAL" of the European Tyre and Rim Technical Organisation in Europe, and "JATMA YEAR BOOK" of Japan Automobile Tyre Manufacturers Association in Japan.

Further, "the maximum width position, remotest from the tire equatorial plane, of a sidewall portion" represents a position at an outer surface, remotest from the tire equatorial plane, of each tire side portion of a tire inflated at the predetermined air pressure and right under a predetermined load exerted thereon in the present invention.

In the pneumatic tire of the present invention, the aforementioned vehicle-inner side distance $H_{in}$ in the tire radial direction is preferably set to be 1.1 to 1.3 times as large as the aforementioned vehicle-outer side distance $H_{out}$ in the tire radial direction because then ground-contact properties of the tire mounted on a vehicle outer side more reliably improve and desired stability and controllability can be obtained. More specifically, when the ratio $H_{in}/H_{out}$ is less than 1.1, ground-contact properties of a ground-contact surface on the vehicle outer side of the tread do not improve in a satisfactory manner. When the ratio $H_{in}/H_{out}$ exceeds 1.3, a ground-contact length on the vehicle outer side of a ground-contact surface of the tread is elongated too much and ground-contact properties as a whole rather deteriorate.

Thickness of the side rubber is preferably in the range of 1 mm to 2.5 mm (exclusive of 2.5 mm) in the pneumatic tire of the present invention because then decrease in rolling resistance and improvement of stability and controllability of the tire can be both effectively achieved. When thickness of the side rubber is less than 1 mm, durability of the tire may deteriorate. The side rubber equal to or thicker than 2.5 mm may deteriorate fuel efficiency.

Further, it is preferable in the present invention that:

the ground-contact surface of the tread of the vehicle-outer side half portion of the tire is provided with one circumferential main groove;

the ground-contact surface of the tread of the vehicle-inner side half portion of the tire is provided with two circumferential main grooves; and the average width of a land portion row demarcated between the one circumferential main groove of the ground-contact surface of the vehicle-outer side half portion of the tire and one of the two circumferential main grooves, which is adjacent to the one circumferential main groove, of the ground-contact surface of the vehicle-inner side half portion of the tire is set to be at least 1.5 times as wide as the average width of a land portion row demarcated between the two circumferential main grooves of the ground-contact surface of the vehicle-inner side half portion of the tire.

Good drainage performance as desired is achieved and generation of strong lateral force in a cornering situation is ensured to successfully improve cornering performance when these requirements regarding the circumferential main grooves are satisfied.

Yet further, dimension in the tire radial direction of the bead filler is preferably in the range of 10 mm to 20 mm in the pneumatic tire of the present invention because then volume of the bead filler and consequently tire weight can be reduced to effectively suppress rolling resistance.

Advantageous Effect of the Invention

According to the present invention, rolling resistance of a tire can be effectively reduced by reducing tire weight, while ensuring sufficiently high durability and good stability and controllability of the tire.

DESCRIPTION OF THE EMBODIMENTS

An embodiment of the present invention will be described hereinafter with reference to the drawings.

Figure 1:
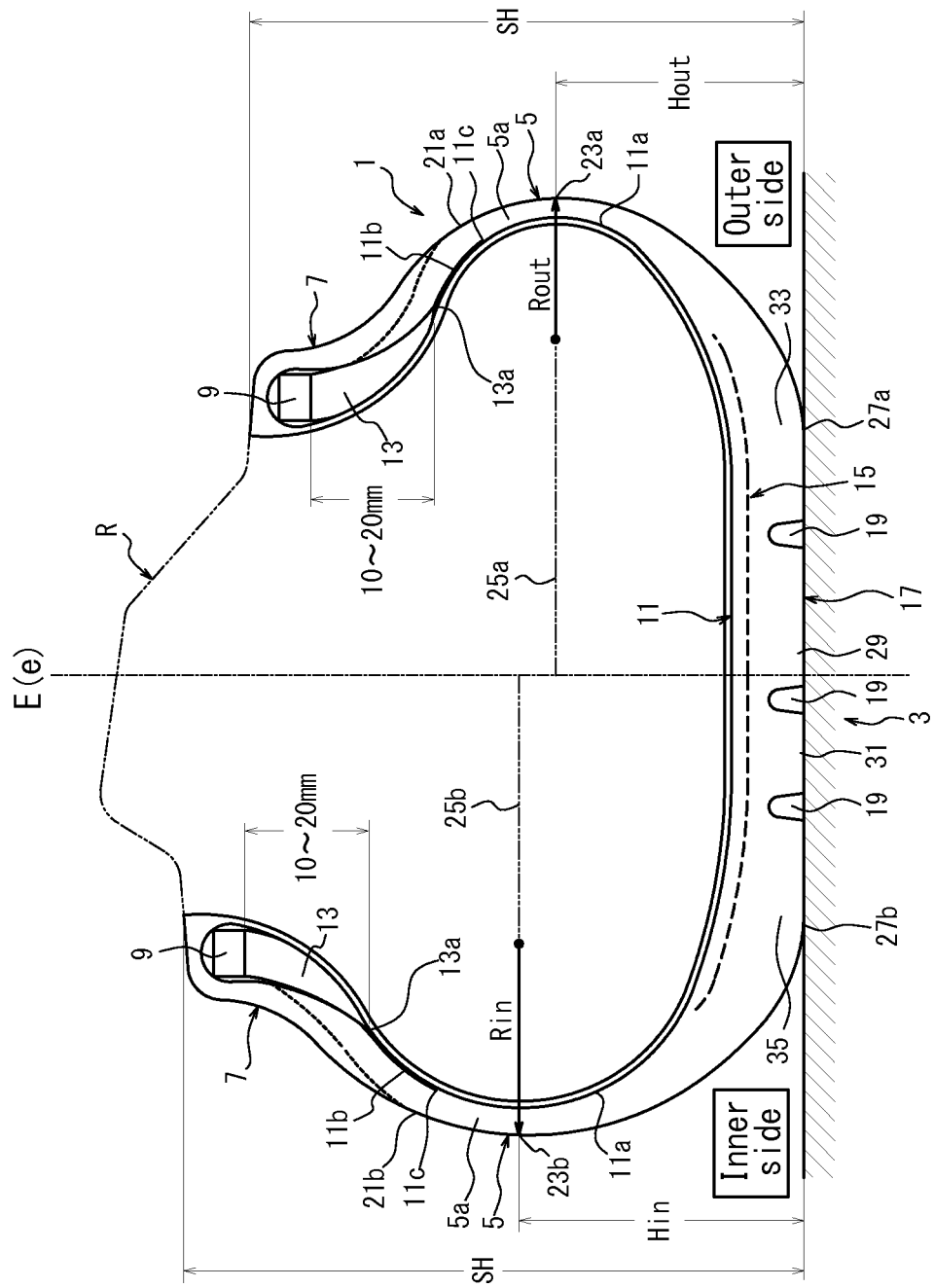
FIG. 1 is a cross sectional view in the tire widthwise direction of a tire according to the present invention, in a state where the tire has been assembled with an application rim, inflated at predetermined air pressure and mounted on a vehicle with predetermined load exerted thereon.

A pneumatic radial tire 1 according to the embodiment is shown in FIG. 1 in a state where the tire is assembled with an application rim R, inflated at predetermined air pressure and mounted on a vehicle with predetermined load exerted thereon. Specifically, a half portion on the right-hand side with respect to the tire equatorial plane E of the tire 1 is situated on the outer side of the vehicle and a half portion on the left-hand side with respect to the tire equatorial plane E of the tire 1 is situated on the inner side of the vehicle in the state shown in FIG. 1. Indication portions (not shown in FIG. 1) indicating a direction in which the tire is to be mounted and/or a direction in which the tire is to be rotated are provided at a tire surface to assist an operator in mounting the tire on a vehicle.

Reference number 3 represents a tread portion, 5 represents each sidewall portion continuous with each side part of the tread portion 3 to extend on the inner side in the tire radial direction, and 7 represents each bead portion provided to be continuous with an inner end in the tire radial direction of each sidewall portion 5 in FIG. 1.

A main body portion 11a of a radial carcass 11 constituted of at least one carcass ply (a single carcass ply in the example shown in FIG. 1) is provided across a pair of bead cores 9 embedded in the respective bead portions 7 such that the main body portion 11a extends in a toroidal shape between the bead cores 9. The radial carcass 11 also has turn-up portions 11b respectively wound up around the bead cores 9 from the inner side toward the outer side of the main body portion 11a in the tire widthwise direction. A bead filler 13 is provided between the main body portion 11a and each turn-up portion 11b such that the bead filler 13 extends from a position adjacent to an outer peripheral surface of the corresponding bead core 9 toward the outer side in the tire radial direction to taper off to a point. In this connection, each of the turn-up portions 11b of the carcass 11 is disposed such that distance between the turn-up portion 11b and the main body portion 11a remains 1 mm or less at a tip portion of the turn-up portion 11b on the outer side in the tire radial direction than the bead filler 13. Each turn-up portion 11b may be separated from the main body portion 11a, although these two portions are in contact with each other in the example shown in FIG. 1. The definition that "distance between the turn-up portion 11b and the main body portion 11a remains 1 mm or less" means that length of a line drawn normal to the main body portion 11a from the turn-up portion 11b is constantly 1 mm or less in the tip portion of the turn-up portion 11b. Further, the end 11c on the outer side in the tire radial direction of each turn-up portion 11b (which end will be referred to as "the turn-up end" hereinafter) is to be separated by shortest distance of at least 5 mm from the tip end 13a in the outer side in the radial direction of the bead filler 13.

Yet further, the end 11c on the outer side in the tire radial direction of each turn-up portion 11b, i.e. the turn-up end 11c, is disposed on the inner side in the tire widthwise direction than a neutral axis of bending of the bead portion and a corresponding sidewall portion and at 10%-40% height of a tire cross sectional height SH in the tire radial direction (the neutral axis exists between an outer surface of the tire and the carcass, along the main body portion 11a with substantially constant distance between the main body portion and itself, in the bead portion and the sidewall portion).

Yet further, side rubber 5a is disposed on the outer side in the tire widthwise direction of the carcass ply 11 to cover the turn-up end 11c and constitute a part of the outer surface of the tire. A belt 15 is provided on the outer periphery side of a crown region of the carcass 11.

Rigidity of the tire can be enhanced by disposing the main body portion 11a and each turn-up portion 11b of the carcass ply 11 to extend close to each other. Further, crack generation originating from the turn-up end 11c can be prevented to ensure good durability of the tire by disposing the turn-up end 11c of each turn-up portion 11b at a position on the inner side in the tire widthwise direction than the neutral axis of bending and providing side rubber 5a on the outer side in the tire widthwise direction of each turn-up end 11c. Yet further, it is possible to reduce weight and eccentricity of the tire to decrease rolling resistance thereof by making the tire smaller by disposing each turn-up end 11c of the carcass ply at 10%-40% height of a tire cross sectional height SH measured from the innermost end in the radial direction of the tire (i.e. the rim diameter line). In this connection, it is preferable to dispose each turn-up end 11c at 10%-30% height of a tire cross sectional height SH measured from the innermost end in the radial direction of the tire (i.e. the rim diameter line) because then an effect of reducing rolling resistance can be more effectively obtained. Yet further, it is possible to split a rigidity changing point into two sites to disperse stress and suppress occurrence of separation troubles by setting distance between each turn-up end 11c and the corresponding bead filler end 13a to be at least 5 mm.

Thickness of the side rubber 5a is preferably in the range of 1 mm to 2.5 mm (exclusive of 2.5 mm) and more preferably in the range of 1.5 mm to 2.0 mm. Dimension in the tire radial direction of the bead filler 13 is preferably in the range of 10 mm to 20 mm and more preferably in the range of 10 mm to 15 mm. Weight and thus rolling resistance of a tire can be further effectively reduced by setting thickness of the side rubber 5a and dimension in the tire radial direction of the bead filler 13 as described above.

Plural circumferential (and annular) main grooves 19 continuously extending in the tread circumferential direction in a configuration as desired (such as linear, zigzag) are formed in a ground-contact surface 17 of the tread of the pneumatic tire 1 having such an internal reinforcing structure as described above. A lateral groove or a slant groove (not shown) extending to intersect the circumferential main groove 19 may be formed in the ground-contact surface 17.

In the tire 1 of the present invention, in a cross sectional view in the tire widthwise direction thereof as shown in FIG. 1, provided that: an imaginary line 25a, passing through the maximum width position 23a remotest from the tire equatorial plane E in a tire side portion 21a situated on the vehicle outer side, extends to be orthogonal to the tire equatorial plane E; an imaginary line 25b, passing through the maximum width position 23b remotest from the tire equatorial plane E in a tire side portion 21b situated on the vehicle inner side, extends to be orthogonal to the tire equatorial plane E; $H_{out}$ represents a distance in the tire radial direction between the imaginary line 25a and a ground-contact end 27a on the vehicle outer side of the tread; and $H_{in}$ represents a distance in the tire radial direction between the imaginary line 25b and a ground-contact end 27b on the vehicle inner side of the tread, $H_{out}<H_{in}$. It is preferable to set the distance $H_{in}$ in the tire radial direction to be 1.1 to 1.3 times as large as the distance $H_{out}$ in the tire radial direction.

Yet further, a negative ratio, i.e. a groove area ratio, of the ground-contact surface 17 of the tread of the half portion, on the vehicle outer side, of the tire when the tire is mounted on the vehicle is smaller than a negative ratio of the ground-contact surface 17 of the tread of the half portion, on the vehicle inner side, of the tire when the tire is mounted on the vehicle. It is preferable to set the negative ratio in the vehicle-inner side half portion to be 1.5 to 2.0 times as large as the negative ratio in the vehicle-outer side half portion.

Figure 2:
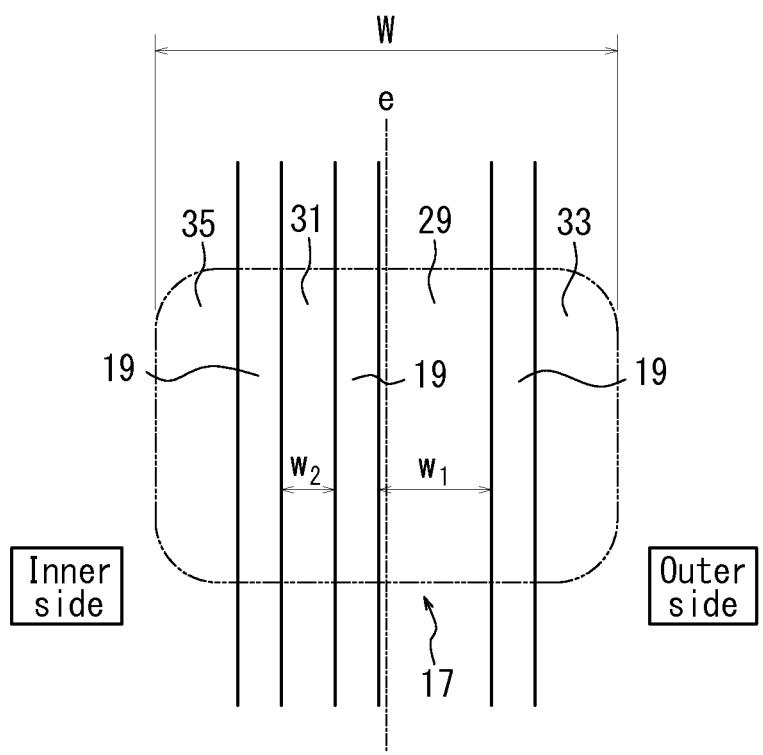
FIG. 2 is a developed partial plan view of a tread pattern as an example of a ground-contact surface of a tread having circumferential main grooves formed therein.

Yet further, plural circumferential (and annular) main grooves 19 extending in a configuration as desired such as linear, zigzag shape (two linear circumferential main grooves 19 in FIG. 2) are formed in the tread 3 such that these main grooves 19 are located in a half portion on the vehicle-inner side with respect to the tire equatorial plane e, of the ground-contact surface 17 of the tread of the tire 1 when the tire 1 is mounted on a vehicle; and another one circumferential (and annular) main groove 19, which extends in a configuration as desired, is formed in the tread 3 such that the one main groove 19 is located in a half portion on the vehicle-outer side with respect to the tire equatorial plane e, of the ground-contact surface 17 of the tread of the tire 1 when the tire 1 is mounted on a vehicle, as exemplarily shown in a developed view of a tread pattern of FIG. 2. The negative ratio in the vehicle-inner side half portion of the ground-contact surface 17 of the tread and the negative ratio in the vehicle-outer side half portion of the ground-contact surface 17 are set as described above, respectively.

Yet further, the average width w1 of a land portion row 29 demarcated between the one circumferential main groove 19 of the vehicle-outer side half portion and one of the two circumferential main grooves 19 (that adjacent to the one circumferential main groove) of the vehicle-inner side half portion, of the ground-contact surface 17, is set to be at least 1.5 times as wide as the average width w2 of a land portion row 31 demarcated between the two circumferential main grooves 19 of the vehicle-inner side half portion of the ground-contact surface 17.

As a result of the aforementioned structures, the vehicle-inner side half portion of the ground-contact surface 17 can demonstrate good drainage performance as required and land portions of the vehicle-outer side half portion of the ground-contact surface 17 is imparted with rigidity as required so that strong lateral force is generated in a cornering situation to improve cornering performance of the tire.

A land portion row 33 demarcated between the one circumferential main groove 19 in the vehicle-outer side half portion and the ground-contact end 27a on the outer side in the tire widthwise direction, of the ground-contact surface 17, and a land portion row 35 demarcated between one of the two circumferential main grooves 19 in the vehicle-inner side half portion and the ground-contact end 27b on the inner side in the tire widthwise direction, of the ground-contact surface 17, may have widths equivalent to 25% to 30% of the ground-contact surface width W of the tread, respectively. Phantom line in FIG. 2 represents an example of outline of a foot print.

Figure 3A:
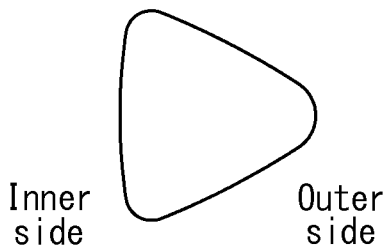
FIG. 3A is a diagram showing an example of an outline of a foot print observed in a conventional tire during straight running of a vehicle.
Figure 3B:
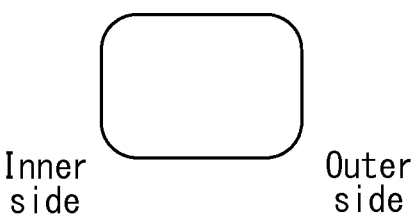
FIG. 3B is a diagram showing an example of an outline of a foot print observed in the tire of the present invention during straight running of a vehicle.

According to the tire 1 structured as described above, radius of curvature $R_{out}$ of the tire side portion 21a on the vehicle outer side when the tire is mounted on a vehicle, at the maximum width position 23a of the tire side portion 21a, is made smaller than radius of curvature $R_{in}$ of the tire side portion 21b on the vehicle inner side when tire is mounted on the vehicle, at the maximum width position 23b of the tire side portion 21b, so that the tire side portion 21a on the vehicle outer side is sufficiently deformed by expanding toward the outer side in the tire widthwise direction when load is exerted on the tire. As a result, an outline of a foot print of the tire during straight running of a vehicle, which takes on a substantially blunt triangle-like shape as shown in FIG. 3A in the conventional tire having a symmetrical cross sectional configuration in the tire widthwise direction with respect to the tire equatorial plane e, can be improved to a substantially rectangular shape as shown in FIG. 3B, so that a ground-contact length in the tread circumferential direction of a ground-contact surface on the vehicle-outer side of the tread can be sufficiently elongated. That is, according to the tire 1 of the present invention, it is possible to reduce tire weight and also make the tire demonstrate good stability and controllability in straight running and cornering, respectively, due to high road-surface-gripping force achieved under a large ground-contact area.

Figure 4:
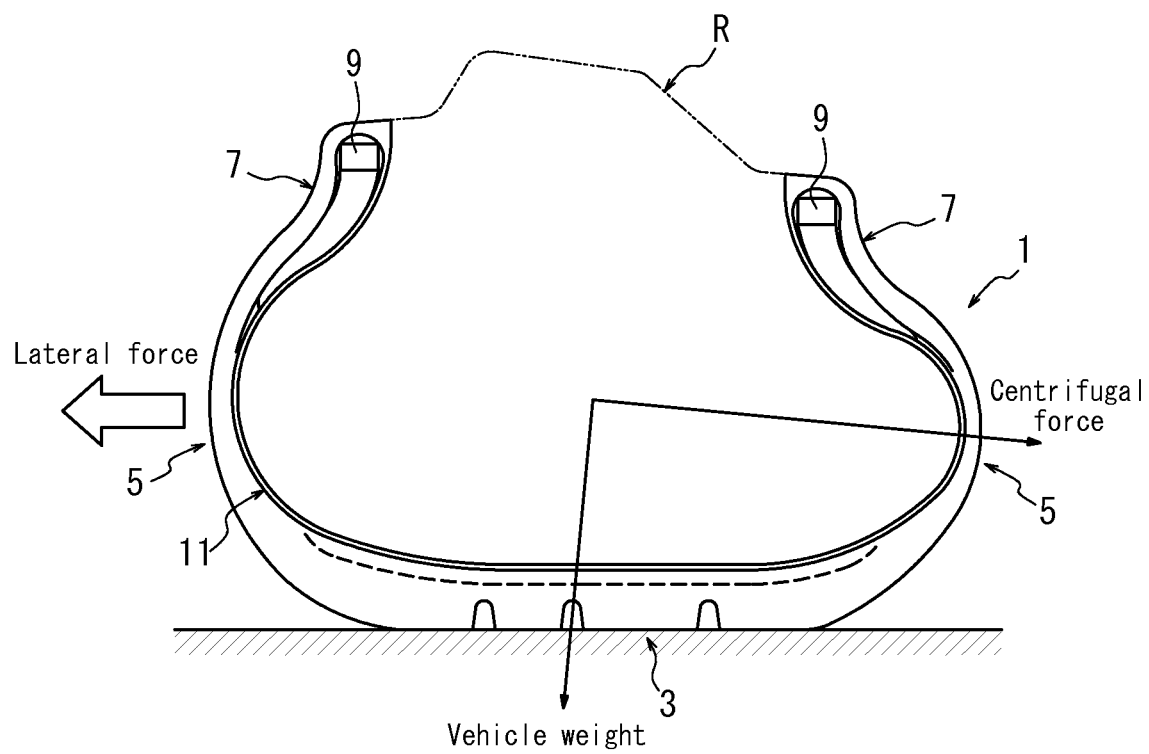
FIG. 4 is a cross sectional view in the widthwise direction of a tire having the tread pattern of FIG. 2, exemplarily showing how lateral force is generated in a cornering situation of a vehicle.

Yet further, a negative ratio of a ground-contact surface 17 of the tread of the vehicle-outer side half portion of the tire is set to be smaller than a negative ratio of a ground-contact surface of the tread of the vehicle-inner side half portion of the tire in the tire 1 of the present invention, so that rigidity of land portions of the ground-contact surface 17 of the tread of the vehicle-outer side half portion of the tire increases. The land portions of the ground-contact surface 17 of the tread of the vehicle-outer side half portion of the tire, having rigidity thus increased, can reliably generate lateral force large enough to resist centrifugal force when these land portions are situated on the outer side in a cornering situation of a vehicle, as shown in FIG. 4.

EXAMPLES

Tests for evaluating "rolling resistance", "stability and controllability" and "durability" were carried out for each of tires of Examples 1-13 and Comparative Examples 1-3 having size: 155/65 R13. The measurement results shown in Table 1 are expressed as index values relative to the results of Comparative Example 1 tire as the control each expressed as 100.

Specifically, each of Example 1-13 tires had in a cross sectional view thereof in the tire widthwise direction in a state where the tire was assembled with an application rim, inflated at a predetermined air pressure and mounted on a vehicle under a predetermined load exerted thereon: i) turn-up ends each disposed on the inner side in the tire widthwise direction than a neutral axis of bending of the bead portion and a corresponding sidewall portion; ii) radius of curvature ($R_{out}$) of an outer surface of the sidewall portion on the vehicle outer side, at the maximum width position remotest from the tire equatorial plane of the sidewall portion, of 60 mm; iii) radius of curvature ($R_{in}$) of an outer surface of the sidewall portion on the vehicle inner side, at the maximum width position remotest from the tire equatorial plane of the sidewall portion, of 80 mm; iv) a negative ratio of a ground-contact surface of the tread of the vehicle-outer side half portion of the tire of 30%; and v) a negative ratio of a ground-contact surface of the tread of the vehicle-inner side half portion of the tire of 35%.

On the other hand, each of Comparative Example 1-3 tires had in a cross sectional view thereof in the tire widthwise direction in a state where the tire was assembled with an application rim, inflated at a predetermined air pressure and mounted on a vehicle under a predetermined load exerted thereon: i) turn-up ends each disposed on the inner side in the tire widthwise direction than a neutral axis of bending of the bead portion and a corresponding sidewall portion; ii) radius of curvature ($R_{out}$) of an outer surface of the sidewall portion on the vehicle outer side, at the maximum width position remotest from the tire equatorial plane of the sidewall portion, of 70 mm; iii) radius of curvature ($R_{in}$) of an outer surface of the sidewall portion on the vehicle inner side, at the maximum width position remotest from the tire equatorial plane of the sidewall portion, of 70 mm; iv) a negative ratio of a ground-contact surface of the tread of the vehicle-outer side half portion of the tire of 30%; and v) a negative ratio of a ground-contact surface of the tread of the vehicle-inner side half portion of the tire of 35%.

Regarding the parameters shown in Table 1, "Carcass turn-up height (%)" represents ratio (%) of a distance in the tire radial direction measured from the radially innermost end (the rim diameter line) to the turn-up end of the carcass with respect to the tire cross sectional height SH; "$H_{in}/H_{out}$" represents ratio of a distance ($H_{in}$) in the tire radial direction between the maximum width position of the vehicle-inner side sidewall portion and a ground-contact end on the vehicle inner side of the tread, with respect to a distance ($H_{out}$) in the tire radial direction between the maximum width position of the vehicle-outer side sidewall portion and a ground-contact end on the vehicle outer side of the tread; and "Bead filler height (mm)" represents dimension (mm) of the bead filler in the tire radial direction.

The main body portion and each turn-up portion of the carcass ply were disposed such that these two portions in a region on the outer side in the tire radial direction than the tip end of the bead filler extended with distance therebetween of 1 mm in Examples 1-12 and Comparative Examples 1 and 2. The main body portion and each turn-up portion of the carcass ply were disposed such that these two portions in a region on the outer side in the tire radial direction than the tip end of the bead filler extended with distance therebetween of 1.2 mm in Comparative Example 3. The main body portion and each turn-up portion of the carcass ply were disposed such that these two portions in a region on the outer side in the tire radial direction than the tip end of the bead filler extended with distance therebetween of 0.8 mm in Example 13. Distance between each turn-up end of the carcass and the corresponding outer tip end in the tire radial direction of the bead filler was less than 5 mm in Comparative Example 2. Distance between each turn-up end of the carcass and the corresponding outer tip end in the tire radial direction of the bead filler was at least 5 mm in Examples 1-13 and Comparative Examples 1 and 3.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Comp. Ex. 1 | Comp. Ex. 2 | Comp. Ex. 3 |
|---|---|---|---|---|---|---|---|---|---|---|---|---|---|---|---|---|
| Carcass turn-up height (%) | 30 | 10 | 40 | 30 | 30 | 30 | 30 | 30 | 30 | 30 | 30 | 30 | 30 | 50 | 5 | 30 |
| $H_{in}/H_{out}$ | 1.2 | 1.2 | 1.2 | 1 | 1.1 | 1.3 | 1.4 | 1.2 | 1.2 | 1.2 | 1.2 | 1.2 | 1.2 | 1 | 1.2 | 1.2 |
| Bead filler height (mm) | 15 | 15 | 15 | 15 | 15 | 15 | 15 | 8 | 10 | 12 | 20 | 22 | 15 | 15 | 15 | 15 |
| Rolling resistance (index) | 105 | 107 | 104 | 102 | 105 | 105 | 102 | 107 | 107 | 106 | 104 | 101 | 105 | 100 | 107 | 105 |
| Stability and controllability (index) | 105 | 105 | 105 | 101 | 105 | 105 | 101 | 101 | 104 | 105 | 105 | 105 | 105 | 100 | 98 | 105 |
| Durability (index) | 105 | 104 | 105 | 105 | 105 | 105 | 105 | 105 | 105 | 105 | 105 | 105 | 105 | 100 | 98 | 100 |

(Methods for Evaluating Performances)

In the present invention, rolling resistance is determined by: assembling a tire with a standard rim (4.5 J×13) prescribed in JATMA; inflating the tire at air pressure of 210 KPa; running the tire at 80 km/hour on an indoor drum tester with load (2.81 kN) equivalent to 73% of the maximum loading capacity prescribed in JATMA exerted thereon; and measuring resistance in the tire travelling direction generated at a ground-contact surface. Stability and controllability is determined by: assembling a tire with a vehicle-designated rim (4.5 J×13); inflating the tire at the vehicle-designated air pressure (230 KPa) and mounting the tire on a passenger car; running the car on an outdoor test course at speed generally expected of a passenger car (60 km/hour to 120 k/hour) under a loading condition of two passengers (1.19 kN to 2.7 kN); and evaluating stability and controllability of the car by feelings from the passengers. Durability is evaluated by: assembling a tire with a standard rim (4.5 J×13) prescribed in JATMA; inflating the tire at the standard internal pressure; running the tire at 60 km/hour on an indoor drum tester with load equivalent to 100% of the maximum loading capacity prescribed in JATMA exerted thereon; and measuring a distance traveled prior to occurrence of a trouble originated from a turn-up end of the carcass. The larger index value represents the better result.

It is understood from the evaluation results shown in Table 1 that the tires of Examples 1-13 each successfully reduced rolling resistance with maintaining good stability and controllability and sufficiently high durability, as compared with the tires of Comparative Examples.

INDUSTRIAL APPLICABILITY

According to the present invention, it is possible to provide a pneumatic tire capable of effectively reducing rolling resistance with maintaining sufficiently high durability and good stability and controllability.

REFERENCE SIGNS LIST

1 Pneumatic tire (tire)
3 Tread portion
5 Sidewall portion
7 Bead portion
9 Bead core
11 Carcass
13 Bead filler
15 Belt
17 Ground-contact surface of tread
19 Circumferential main groove

The invention claimed is:

1. A pneumatic tire, comprising:
at least one carcass ply constituted of rubber-coated ply cords and including a main body portion extending in a toroidal shape across respective bead cores embedded in a pair of bead portions and turn-up portions respectively turned up around the bead cores from the main body portion to extend on the outer side in the tire radial direction;
a bead filler provided between the main body portion and each of the turned-up portions to extend from the corresponding bead core on the outer side in the tire radial direction; and
a side rubber,
wherein a tip portion extending on the outer side in the tire radial direction than the outer end in the tire radial direction of the bead filler, of each of the turned-up portions, extends to a position of at least 5 mm distance from the outer end in the tire radial direction of the bead filler with maintaining distance of 1 mm or less between the tip portion and the main body portion of the carcass ply,
a turn-up end as the outer end in the tire radial direction of each turn-up portion of the carcass ply is disposed on the inner side in the tire widthwise direction than a neutral axis of bending of the bead portion and a corresponding sidewall portion and at 10%-40% height of a tire cross section measured from the innermost end in the radial direction of the tire,
the side rubber, disposed on the outer side in the tire widthwise direction of the main body portion and each turn-up portion of the carcass ply, covers the turn-up end and constitutes a part of an outer surface of the tire, and
provided that a tire cross sectional height (SH) is ½ of a dimensional difference between outer and inner diameters of a tire inflated at a predetermined internal pressure under no load applied thereon as prescribed by JATMA, the tire cross sectional height (SH) of a tire side portion on the vehicle outer side is smaller than the tire cross sectional height (SH) of a tire side portion on the vehicle inner side.

2. The pneumatic tire of claim 1, wherein, in a cross sectional view in the tire widthwise direction thereof in a state where the tire is assembled with an application rim, inflated at a predetermined air pressure and mounted on a vehicle under a predetermined load exerted thereon, provided that: $L_{out}$ represents an imaginary line, passing through the maximum width position remotest from the tire equatorial plane in a sidewall portion situated on the vehicle outer side, to extend to be orthogonal to the tire equatorial plane; $L_{in}$ represents an imaginary line, passing through the maximum width position remotest from the tire equatorial plane in a sidewall portion situated on the vehicle inner side, to extend to be orthogonal to the tire equatorial plane; $H_{out}$ represents a distance in the tire radial direction between the imaginary line $L_{out}$ and a ground-contact end on the vehicle outer side of the tread; and $H_{in}$ represents a distance in the tire radial direction between the imaginary line $L_{in}$ and a ground-contact end on the vehicle inner side of the tread, $H_{out} < H_{in}$;

- radius of curvature ($R_{out}$) of an outer surface of the sidewall portion on the vehicle outer side, at the maximum width position thereof, is smaller than radius of curvature ($R_{in}$) of an outer surface of the sidewall portion on the vehicle inner side, at the maximum width position thereof; and
- a negative ratio of a ground-contact surface of the tread of a half portion, on the vehicle outer side with respect to the tire equatorial plane, of the tire when the tire is mounted on the vehicle is smaller than a negative ratio of a ground-contact surface of the tread of a half portion, on the vehicle inner side with respect to the tire equatorial plane, of the tire when the tire is mounted on the vehicle.

3. The pneumatic tire of claim 2, wherein the distance $H_{in}$ in the tire radial direction is set to be 1.1 to 1.3 times as large as the distance $H_{out}$ in the tire radial direction.

4. The pneumatic tire of claim 2, wherein:
- the ground-contact surface of the tread of the vehicle-outer side half portion of the tire is provided with one circumferential main groove;
- the ground-contact surface of the tread of the vehicle-inner side half portion of the tire is provided with two circumferential main grooves; and
- the average width of a land portion row demarcated between the one circumferential main groove of the ground-contact surface of the vehicle-outer side half portion of the tire and one of the two circumferential main grooves, which is adjacent to the one circumferential main groove, of the ground-contact surface of the vehicle-inner side half portion of the tire is set to be at least 1.5 times as wide as the average width of a land portion row demarcated between the two circumferential main grooves of the ground-contact surface of the vehicle-inner side half portion of the tire.

5. The pneumatic tire of claim 1, wherein dimension in the tire radial direction of the bead filler is in the range of 10 mm to 20 mm.

6. The pneumatic radial tire of claim 2, wherein the negative ratio in the vehicle-inner side half portion is 1.5 to 2.0 times as large as the negative ratio in the vehicle-outer side half portion.

7. The pneumatic radial tire of claim 1, wherein a negative ratio of a ground-contact surface of the tread of a half portion, on the vehicle inner side with respect to the tire equatorial plane, of the tire when the tire is mounted on the vehicle is 1.5 to 2.0 times as large as a negative ratio of a ground-contact surface of the tread of a half portion, on the vehicle outer side with respect to the tire equatorial plane, of the tire when the tire is mounted on the vehicle.

* * * * *